May 25, 1926.
F. E. COMSTOCK
1,586,178
WEEDLESS FISHHOOK
Filed July 14, 1923
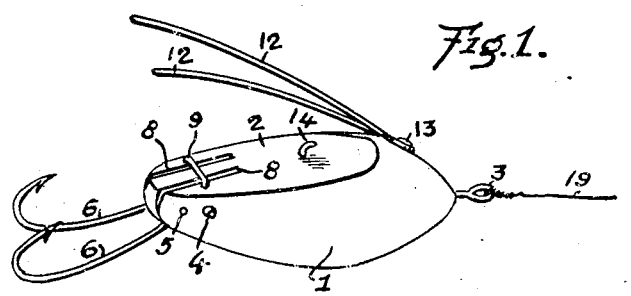
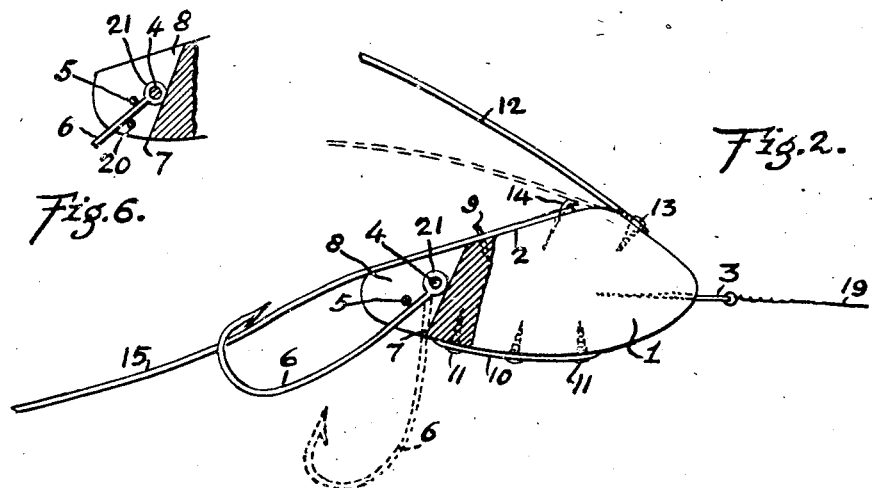
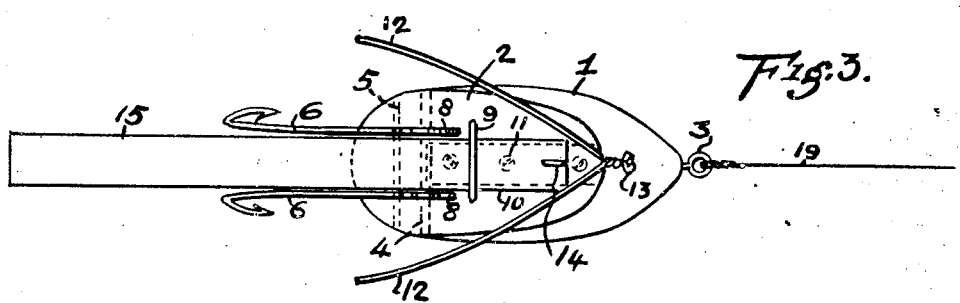
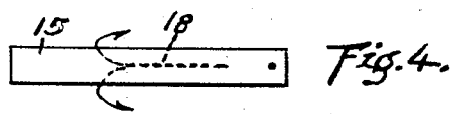
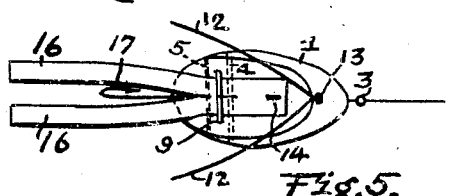

Patented May 25, 1926.

1,586,178

UNITED STATES PATENT OFFICE.

FREDERICK E. COMSTOCK, OF VALPARAISO, INDIANA.

WEEDLESS FISHHOOK.

Application filed July 14, 1923. Serial No. 651,508.

My invention relates to improvements in weedless fish hooks, and it more especially consists of the features hereinafter pointed out in the annexed claims.

The purpose of my invention is to provide an effective form of weedless fish hook which comprises a suitable floating body with attachable and detachable hooks that may be secured in a rigid or vertically pivoted manner; that has combined therewith a pork rind or other bait guide; that uses overhead weed guards whose free ends, contrary to usual custom, are placed some distance away from the barbed end of the hook; that provides a removable weighted keel; and that is also adapted to a single or twin type of hook as well as a pair of separate hooks.

With these and other ends in view, I illustrate in the accompanying drawing such instances of adaptation as will disclose the broad underlying features without limiting myself to the specific details shown thereon and described herein.

Figure 1 is a perspective view showing the relation of parts with the bait guide placed near the rear end of the body.

Fig. 2 is a side elevation partly in section, showing in dotted lines a change in position of the weed guards and the pivoted hooks, also showing the pork rind bait and the bait guide placed nearer the center of the body than is shown in Fig. 1.

Fig. 3 is a plan view of Fig. 2.

Fig. 4 is a detached plan of a twin hook.

Fig. 5 is a reduced size plan view of a single hook attached to the body.

Fig. 6 is a detached elevation partly in section showing a removable hook rigidly attached.

In practically carrying out my invention, I may use any desired form of body 1. In the instance exemplified this body is composed of wood or any material that will readily float on the water. When desired, the body may be submerged more or less through the attachment on its under side of a metallic keel 10 secured by suitable screws 11. This may be heavier or lighter according to the depth of water in which the fisherman desires to cast. In addition to such purpose, the keel 10 will serve to also keep the body 1 floating on or near the upper surface of the water in an erect position. The body 1 at its front end is provided with a suitable eye 3 to which the fish line 19 is attached. At the rear end of the body, when a pair of hooks 6 is used, two slots 8 are formed in which the hooks may have vertical movement around the pivot pin 4; which movement is limited vertically by the pin 5 and in a downward direction by the edge 7 of the slots 8.

The upper portion of the body 1 may be flattened at 2 to form a seat for the bait 15. This is attached to any desired form of pin or hook 14, from where the bait passes through under the staple or guide 9 which prevents the bait from unnecessary sidewise movement and thus obviates its becoming entangled with the hook 6. In case a single hook 17 and a single slot 8 are used, as shown in Fig. 5, then the pork rind bait 16 would be slit so as to allow one-half to pass on each side of the hook. When the twin hook 18, shown in Fig. 4, is used an unslitted pork rind 15 will pass between the barbed ends of the hook similar to its position in Fig. 3.

The weed guards 12 are made of thin spring wire and are twisted together near a retaining screw 13 under which they are secured to the body. It will be noted that quite contrary to usual practice, the free ends of the weed guards 12 are quite a distance away from the striking position of the barbed ends of the hooks 6. It is of course understood that the exact point where these weed guards terminate may under certain circumstances be located almost directly above the barbed end of the hook or hooks instead of a little forward of this point, as shown. Whenever weeds are encountered, the guards 12 will naturally be depressed more or less, at the same time holding up the weeds and also diverting them sidewise so that the weeds will not become entangled with the hooks. Another feature resides in the fact that the weed guards can not be grasped by the fish when a successful strike is made.

The hooks 6, shown in Fig. 2, are in approximate striking relation to the bait 15 and in this figure the other position of the hooks is shown in dotted lines. If for any reason the fisherman desires to substitute other types of hooks, he may do so by removing the pin 4, placing the substituted hooks in the slots 8 and reinserting the pin. If it is desired to use non-pivoted hooks and still retain the interchangeability feature, an extra pin 20 may be placed beneath the hooks 6, as shown in Fig. 6. The pin 20 is sufficiciently removed from the pin 5 so that the eye 21 of the hooks 6 will pass between the two pins as the hooks are pushed into the slots 8 to receive the pin 4. Whenever stationary hooks are to be changed over to pivoted hooks, it is only necessary to remove the pin 20, and vice-versa when a rigid interchangeable type of hook is desired, the simple insertion of pin 20 will secure this result.

An outstanding feature of my invention consists in the controlled buoyancy of the hook body and its self-righting characteristics, the self-adjusting feature of pivoted hooks which permits them to easily slide over weeds, mosses, etc. In actual practice, followers of Isaac Walton have found my weedless hook to be practically free from annoying entanglements with weeds, etc., and a very satisfactory self-righting form of combined bait and hook.

What I claim is:

1. In fish hooks, a floating body having a relatively flat upper surface, barbed means attached to the rear end of the body, means for securing a suitable bait to the upper face of the body, and a suitable bait guiding means located on the body between the bait fastening means and the rear end of the body.

2. In fish hooks, a floating body, means detachably secured thereto on its under side adapted to hold the body in a predetermined vertical position and in a desired depth of water, attachable and detachable barbed means secured to the rear end of the body, upwardly and sidewise projecting weed guards secured to the body the free ends of said guards being spaced apart from the barbed means, means for attaching a bait to the body, and means for limiting the sidewise movement of the bait.

3. In fish hooks, a floating body, a pair of attachable and detachable hooks secured in slots to the rear end of the body, means transverse of the slots for limiting the movement of the hooks, means for securing a bait to the upper face of the body, means on the body for securing one end of the bait, and means located on the body between the bait fastening means and the rear end of the body for limiting the sidewise movement of the bait.

4. In a fish bait the combination of a flattened oval-shaped body provided in its rear end with a narrow vertical recess, a pivot pin extending through said recess, a hook pivoted on said pin and adapted to swing in a vertical plane within said recess, and a pair of weed guard prongs secured to the forward end of the body on the upper side and extending rearwardly and upwardly with respect to the body and in diverging relation with respect to one another, substantially as described.

In testimony whereof I affix my signature.

FREDERICK E. COMSTOCK.